3,368,443
FLANGED NUT
Thomas L. Faul, Skaneateles, N.Y., assignor to Aqua-Marine Mfg. Limited, Toronto, Ontario, Canada
Filed May 8, 1967, Ser. No. 636,751
5 Claims. (Cl. 85—32)

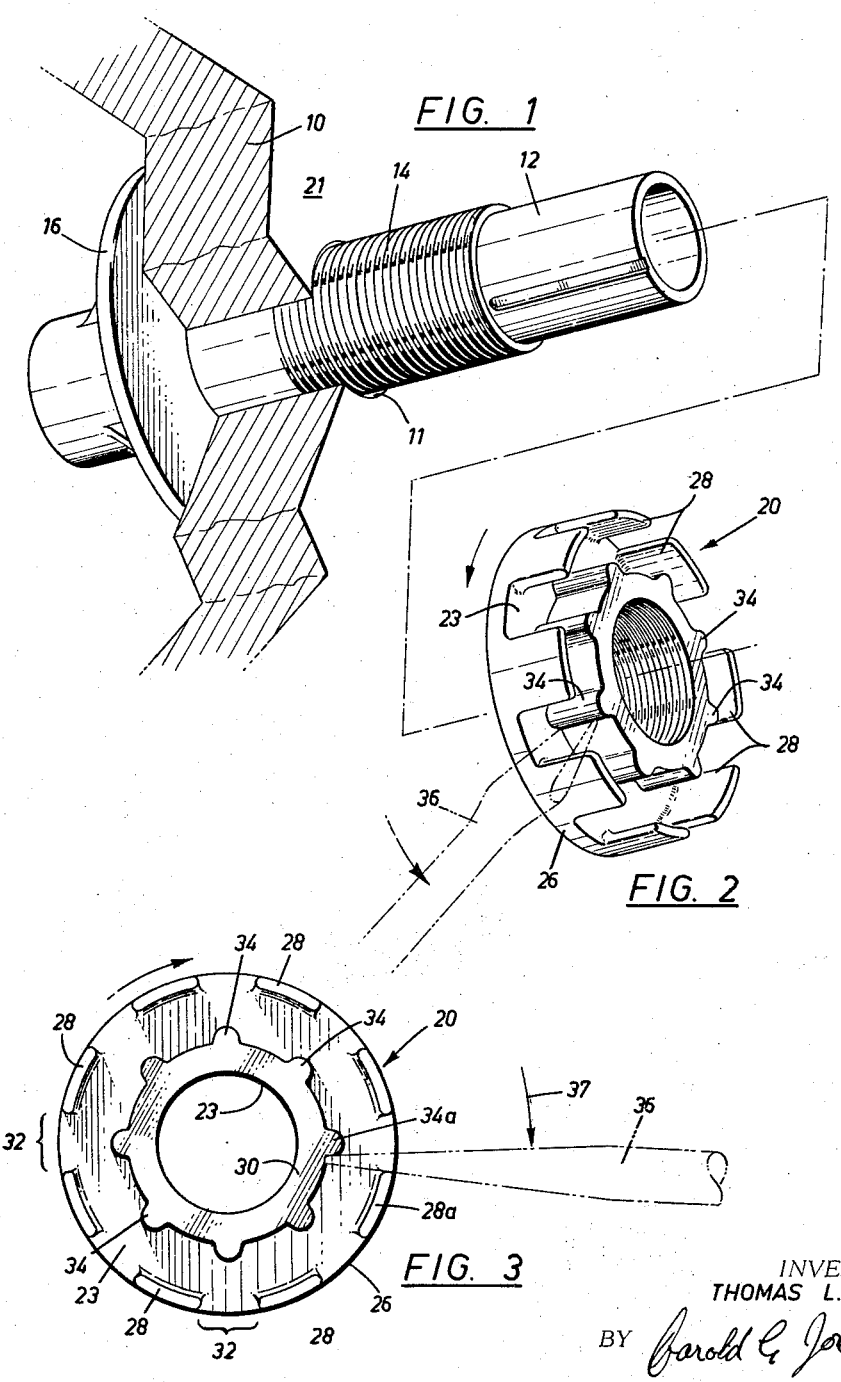
Feb. 13, 1968     T. L. FAUL     3,368,443
FLANGED NUT
Filed May 8, 1967
INVENTOR.
THOMAS L. FAUL
Attorney United States Patent Office 3,368,443
Patented Feb. 13, 1968

ABSTRACT OF THE DISCLOSURE

A nut having an annular flange projecting outwardly from a central, internally threaded hub. The flange has a number of spaced, upstanding teeth around its outer periphery and the hub has axial ribs on its outer periphery, thus enabling a pointed tool such as a screw-driver to be inserted between two teeth and engaged with a rib for the purpose of tightening or loosening the nut.

---

This invention relates to the design of a nut which is particularly suitable for nuts whose inner threaded diameter is of considerable size.

It is an object of this invention to provide a flanged nut with a high ratio of strength to weight.

It is another object of this invention to provide a flanged nut capable of being tightened or loosened with the aid of a pointed tool such as a screwdriver.

Accordingly, this invention provides a nut comprising: an annular flange having an inner edge and an outer edge, a plurality or peripherally spaced, upstanding teeth extending axially in one direction from said outer edge, a generally cylindrical, internally threaded hub extending axially in said one direction from said inner edge, the hub having around its outer surface a plurality of point-engagement means spaced such that at least one such means is located radially inwardly from each inter-tooth space, in order to permit a pointed tool to be inserted between two adjacent teeth and into the appropriate point-engagement means to function as a lever for tightening or loosening said nut.

One embodiment of this invention is shown in the accompanying drawings, in which like numerals refer to like parts throughout the several views, and in which:

FIGURE 1 is a partly broken-away perspective view of a sleeve for a boat steering wheel shaft, the sleeve passing through a suitable hole in the dashboard;

FIGURE 2 is a perspective view of a flanged nut constructed in accordance with this invention and adapted to be threaded onto the sleeve of FIGURE 1; and FIGURE 3 is an axial plan view of the flanged nut of FIGURE 2.

In FIGURE 1 is shown a broken-away dashboard 10 in which a suitable hole 11 has been bored to permit the passage therethrough of a sleeve 12 for a steering wheel shaft (not shown). The sleeve 12 is equipped with external threads 14 and an integral back-up flange 16.

The flanged nut 20 shown in FIGURE 2 is adapted to be fitted over the sleeve 12, threaded onto the external threads 14, and brought into tightened engagement with the face 21 of the dashboard 10, such as to compress the latter between the nut 20 and the back-up flange 16. Referring now to both FIGURES 2 and 3, the flanged nut of this invention is seen to comprise an annular flange 23 having an inner edge 24 and an outer edge 26. A number of upstanding teeth 28, all identical, are peripherally spaced around the outer edge 26 of the flange 23, all extending axially in the same direction. Preferably, the teeth are set at equal spacings 32, and in the embodiment shown, each of the eight teeth subtends an angle of approximately 25° at the axis of the nut 20. It will readily be appreciated that neither the number of teeth shown, nor the angle each subtends at the axis of the nut 20, is an especially critical factor, the number and subtended angle having to be chosen in accordance with the use to which the flanged nut is to be put.

The nut also includes a generally cylindrical, internally threaded hub 30 which extends axially from the inner edge 24 of the flange 23 in the same direction as the teeth 28 extend. The hub 30 has around its outer surface a plurality of point-engagement means spaced such that at least one such means is located radially inwardly from each inter-tooth space 32 (see FIGURE 3). In the embodiment shown, the plurality of point-engagement means consists of a number of outwardly projecting ribs 34 extending in the axial direction, each being located radially inwardly from an inter-tooth space 32. It is to be noted that each rib 34 has a peripheral dimension less than its corresponding inter-tooth space 32.

With this arrangement, a pointed tool such as a screwdriver 36 (shown in broken lines in FIGURES 2 and 3) can be inserted between two adjacent teeth 28 and engaged with the appropriate rib 34 to function as a lever for tightening or loosening the nut 20. With a conventional thread, the screwdriver 36 is positioned in FIGURE 2 for loosening the nut, and in FIGURE 3 for tightening it.

Directing attention specifically to FIGURE 3, it will be seen that pressure on the screwdriver 36 in the direction of the arrow 37 will cause the tooth 28a to act as a fulcrum for the lever constituted by the screwdriver 36, such that a shearing force in the counterclockwise direction will be applied to the rib 34a, and such that a shearing force in the clockwise direction will be applied to the tooth 28a. Naturally, the dimensions of both the tooth 28a and the rib 34a are such that both are able to withstand the forces applied to them, so that the nut 20 will be loosened or tightened to the desired degree, in preference to either the rib 34a or the tooth 28a shearing off.

It should be noted that each tooth 28 has a substantially larger peripheral dimension than radial dimension, such that when a given tooth functions as a fulcrum for the screwdriver 36 during tightening or loosening, that tooth receives the applied force along its larger dimension, in which it is strongest. Each tooth 28 is constructed in this way because it is particularly desirable that the pointed tool, for example the screwdriver 36, when functioning as a lever to tighten or loosen the nut 20, be oriented in a direction which is approximately radial with respect to the nut 20. The reason for this is that, since the hollow cylindrical hub 30 has a comparatively thin wall, it is highly desirable that any forces applied to this wall be applied in a circumferential direction, rather than in a radial direction, and it will be appreciated that when the screwdriver 36 is inserted as shown in FIGURE 3, and when force is applied to it as shown by the arrow 37, it is circumferential forces that result in the hub 30, with a minimum of radial stress. Radial stresses are to be avoided with a thin-walled hub such as that shown, because they would tend to distort the hub away from circularity, thereby greatly increasing the inter-thread friction, such that the person tightening the nut 20 would have a false idea about the extent to which the nut is tightened.

Naturally, it is preferable that all of the parts of the flanged nut shown in FIGURES 2 and 3 be made integral with one another, although it is conceivable that at least the hub and flange could be made as separate items which are subsequently welded together.

While a preferred embodiment of this invention has been disclosed herein, those skilled in the art will appreciate that changes and modifications may be made therein without departing from the spirit and scope of this invention as defined in the appended claims.

What I claim as my invention is:

1. A nut comprising:

an annular flange having an inner edge and an outer edge, a plurality of peripherally spaced, upstanding teeth extending axially in one direction from said outer edge, a generally cylindrical, internally threaded hub extending axially in said one direction from said inner edge, the hub having around its outer surface a plurality of point-engagement means spaced such that at least one such means is located radially inwardly from each inter-tooth space, in order to permit a pointed tool to be inserted between two adjacent teeth and engaged with the appropriate point-engagement means to function as a lever for tightening or loosening said nut.

2. A nut as claimed in claim 1, in which the teeth have a substantially larger peripheral dimension than radial dimension, such that when a tooth functions as a fulcrum for said pointed tool during tightening or loosening said tooth receives the applied force along its larger dimension, in which it is strongest.

3. A nut as claimed in claim 1, in which said plurality of point-engagement means is a plurality of outwardly projecting ribs, each rib being located radially inwardly from an inter-tooth space and having a peripheral dimension less than its corresponding inter-tooth space.

4. A nut as claimed in claim 3, in which there are eight equally spaced teeth and eight equally spaced ribs, each tooth subtending an angle of approximately 25° at the axis of the nut.

5. A nut as claimed in claim 4, in which the teeth have a substantially larger peripheral dimension than radial dimension, such that when a tooth functions as a fulcrum for said pointed tool during tightening or loosening said tooth receives the applied force along its larger dimension, in which it is strongest.

References Cited

UNITED STATES PATENTS

| | | | |
|---|---|---|---|
| D. 184,667 | 3/1959 | Curtiss | 85—32.1 |
| 2,049,104 | 7/1936 | Charlton | 85—32 |
| 2,291,846 | 8/1942 | Taylor | 85—45 |
| 2,553,813 | 5/1951 | Dobrick | 85—32 |
| 3,079,830 | 3/1963 | Faroni et al. | 85—32 |

FOREIGN PATENTS

| | | |
|---|---|---|
| 590,397 | 1/1960 | Canada. |
| 631,004 | 11/1961 | Canada. |
| 1,119,435 | 4/1956 | France. |

MARION PARSONS, JR., *Primary Examiner.*